UNITED STATES PATENT OFFICE.

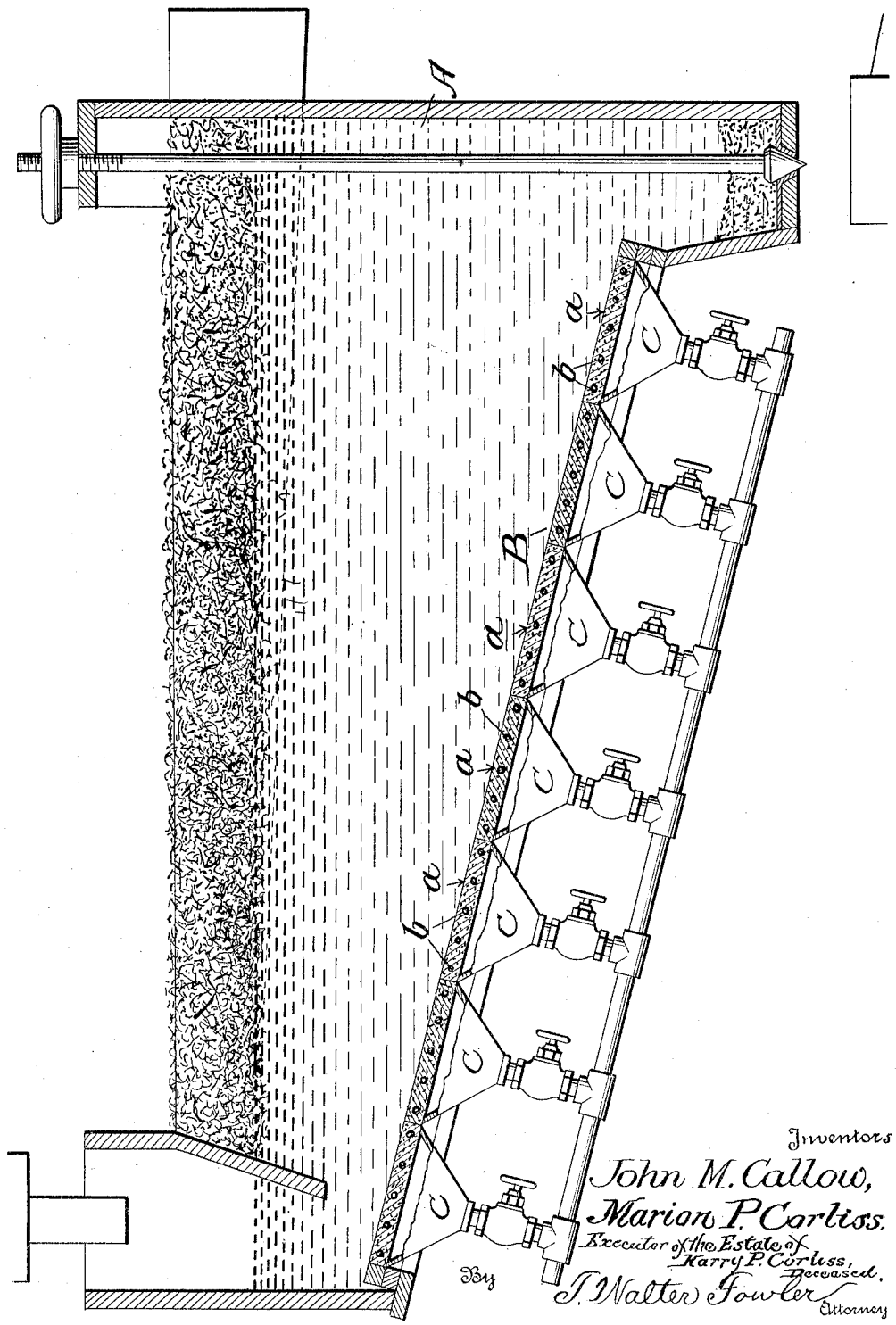

JOHN M. CALLOW, OF SALT LAKE CITY, UTAH, AND HARRY P. CORLISS, DECEASED, BY MARION P. CORLISS, EXECUTRIX, OF PITTSBURGH, PENNSYLVANIA, ASSIGNORS TO METALS RECOVERY COMPANY, OF AUGUSTA, MAINE, A CORPORATION OF MAINE.

FLOTATION APPARATUS AND PROCESS.

1,331,238.          Specification of Letters Patent.      Patented Feb. 17, 1920.

Application filed July 3, 1919. Serial No. 308,410.

*To all whom it may concern:*

Be it known that we, JOHN M. CALLOW, a subject of the King of Great Britain, residing at Salt Lake City, county of Salt Lake, State of Utah, and MARION P. CORLISS, executrix of the estate of HARRY P. CORLISS, deceased, a citizen of the United States, residing at Pittsburgh, in the county of Allegheny and State of Pennsylvania, have invented certain new and useful Improvements in Flotation Apparatus and Process, of which the following is a specification.

Our invention relates to certain new and useful improvements in aeration machines and apparatus and particularly the porous agent employed therein, and the method of producing said agent, for the dissemination of a gaseous medium in fine streams into the mass or solution to be aerated.

In the flotation art, which is illustrative of one use of our invention, it is customary to admit the air or gaseous medium into the tank or cell through a porous bottom. Various substances have been employed for this purpose; in some instances porous bricks are or have been used, but the more common expedient is to supply the tank with a bottom of canvas below which is a chamber into which the air or gas, usually under pressure, is admitted and through which canvas the air or gas is discharged in fine streams into the fluid contents of the tank, causing the generation of bubbles which rise through the solution and pick up and carry to the surface thereof the mineral constituent of the pulp. The bubbles accumulate on the surface of the liquid contents of the tank and finally overflow the top of the tank or through a properly arranged outlet into a suitable launder, the concentrates being finally recovered, as is well known in the art.

The leading object of the present invention is to devise a suitable and more satisfactory substitute for the aforesaid canvas and the porous bricks heretofore used as the means for admitting the gaseous medium into the fluid contents of the tank. Where bricks are used, they are usually composed of carefully screened sand or tailings bound together to form a homogeneous structure by means of Portland cement. Such bricks, however, have not proved satisfactory, the principal defect being that when the cement employed as the binder is reduced to such a quantity as to insure the desired porosity, the bricks so made are found to have little or no strength, and vice versa, when the bricks are made with sufficient Portland cement as a binder to get the necessary strength, they have been found to have insufficient porosity, due to the inherent low tensile strength of Portland cement as a binder.

Other bricks made in a similar way, but using some form of silicious binder, and afterward burnt in a kiln, have also been used. These have also proved unsatisfactory,—first, because of their uniform porosity, and secondly, because they could only be made in comparatively small sizes, bringing about grave difficulties in cementing them in place in a tank and preserving airtight joints between the bricks themselves and the walls of the tank.

To overcome the foregoing objections and to produce a brick for the flotation machine which shall have the desired tensile strength and at the same time shall have the degree of porosity which is required in this art, is the essential object of the present invention.

In order that our invention may be fully understood, we illustrate a sectional view of one well-known type of flotation machine showing the porous bottom in place, but it will be understood that this is but an embodiment of our invention and that it is only illustrative of any of the rectangular, circular, or other tanks commonly used in flotation or other work, and that the porous bottom we are about to describe is capable of use in connection with any flotation or other tank, cell or receptacle and wherever it is designed to discharge more or less fine streams of a gaseous medium into a fluid content. In said drawing, A, represents the tank; B the porous bottom thereof, and C the usual gas chamber underlying the bottom.

In the carrying out of our present invention and which has been arrived at after extended experiment, we make use of the substance now extensively used and commercially known as bakelite, and substitute this for the Portland or other cement heretofore used as the binder for the bricks. The substance named is in the nature of synthetic resin and the proportion of this substance used in the manufacture of our bricks for flotation work, is from ten (10) to twenty (20) per cent. of bakelite, for we have found that with a mixture containing about the proportion of the substance named, we obtain a brick of the porosity we desire and is necessary for the best results, such a brick having a tensile strength of between three-hundred and four-hundred pounds per square inch, and a compression strength of approximately fifteen-hundred pounds per square inch.

The porosity of the brick may be varied to suit requirements—the larger the sand particles, the greater the porosity, and vice versa. Common practice is those particles which will pass through a 14 mesh screen and be held on a 30, but obviously, other sizes of screens may be substituted; likewise, the degree of porosity may be varied with the percentage of cementing material used, although this is generally adjusted to obtain the necessary strength—and the size of the sand used to regulate the porosity.

Prepared bakelite of the proper consistency is mixed with the clean sand and tamped into a mold (which is also the frame that may or may not be used in the flotation tank, cell or receptacle). The molded mixture of sand and bakelite is then dried or baked in a suitable oven, at varying times and temperatures to suit the particular form of bakelite employed, and the size and thickness of the brick. After a period of baking which may vary from 2 to 8 hours or more, and at temperatures varying from 80 to 120° C. or more, it will be found that the material is set and the grains of sand are all firmly cemented together.

Ordinarily, the bricks, a, are made about two (2) inches thick on a three-foot span, and they are generally reinforced with #8 galvanized wires, b, which are suitably placed to be embedded in the mass during the molding operation. Such a re-inforced structure, or element, has a bursting strength of something in excess of one-thousand pounds per square foot, and is probably three or four times stronger than is the similar brick using Portland cement as its binder, and this we consider a decided advantage in a brick for the purpose mentioned.

Another advantage urged for our brick or porous medium is that it is acid-proof, which Portland cement is not. Our improved brick being thus strong and hard, as distinguished from a brick employing Portland cement, the air or gaseous medium used in the flotation process, does not readily enlarge the natural pores of the brick by breaking down the structure at the surface or in the interior of the mass as it passes through; this objection often occurs when using the bricks having Portland cement as a binder.

In the foregoing description we have referred to the superior porosity of the bakelite and a leading reason for this desired quality as well as the greater strength obtained by the use of the material mentioned, is because it is a liquid and comes readily by a capillary action to the points of contact of the sand particles, making the contact especially strong and leaving good spaces between. Portland cement being a finely divided power does not do this nearly as well, even though water is used in the mixing. Bakelite is also inert to almost all chemicals, so that acids, alkalis and such salts as found in an ore pulp do not re-act with it, as they may do with Portland cement.

While we have described our invention for use in the flotation art, i. e. in machines designed for the treatment of metalliferous ores and wherever our improved brick or porous medium is employed for admitting the required air or gas into the fluid contents of the tank, it will be apparent that our invention will be useful in other fields; for instance in the filtration art, or where it is desired to filter a gas or a fluid, as the porous character of our brick, slab or member well adapts it for such work. Consequently, we do not limit the invention in its broader phases to the metallurgical art but we propose to use said porous medium in whatever field it will be found useful. Also, while we have specifically mentioned bakelite as a preferred substance from which to make our porous member, we consider our invention broad enough to include the known equivalents of the same; in other words, any of the synthetic resins or like compositions are included within the scope of our invention.

Having thus described our invention what we claim as new and desire to secure by Letters Patent is:—

1. The combination with a receptacle, of a porous agent therein and composed of a mixture of a synthetic resin and a granular substance molded into form and hardened by the application of heat.

2. A tank, cell, or receptacle having a porous gas-admission agent in its bottom, said agent being composed of a synthetic resin and a granular material molded into shape and baked to form a homogeneous hard brick or slab.

3. A tank, cell or receptacle having a gas chamber and a gas disseminating agent forming a covering therefor, said agent comprising a mixture of synthetic resin and a granular substance molded into form and hardened by the application of heat.

4. In aeration apparatus, a tank, cell or receptacle and a porous agent for the admission of a gaseous medium thereinto, said agent comprising a mixture of a synthetic resin and sand, the mixture being molded into form and hardened by the application of heat.

5. In aeration apparatus, a tank, cell or receptacle and means for admitting a gaseous medium thereinto, said means comprising a porous brick or slab composed of a mixture of bakelite and sand shaped to form and hardened by heat.

6. In aeration apparatus, a tank, cell or receptacle and means for admitting a gaseous medium thereinto, said means comprising a hard, baked porous wall formed of a mixture of a normally mobile synthetic resin and sand.

7. In aeration apparatus, a tank, cell or receptacle and means for admitting a gaseous medium thereinto, said means comprising a hard, baked porous wall formed of an admixture of bakelite and a gritty substance.

8. The method herein described of making a porous gas-admission agent for aeration work, said method consisting, essentially, in reducing a synthetic resin, as bakelite, to a syrup-like consistency and mixing therewith a gritting substance, as sand; then molding the mass into brick-form; then drying the molded mass, and finally baking the mass to hardness.

In testimony whereof we affix our signatures.

JOHN M. CALLOW.
MARION P. CORLISS,
*Executrix of the estate of Harry P. Corliss, deceased.*